United States Patent
Kang (10) Patent No.: US 9,603,220 B2
(45) Date of Patent: Mar. 21, 2017

(54) LED DRIVER APPARATUS

(71) Applicant: MAGNACHIP SEMICONDUCTOR, LTD., Cheongju-si (KR)

(72) Inventor: Tae-kyoung Kang, Cheongju-si (KR)

(73) Assignee: Magnachip Semiconductor, Ltd., Cheongju-si (KR)

(*) Notice: Subject to any disclaimer, the term of this patent is extended or adjusted under 35 U.S.C. 154(b) by 103 days.

(21) Appl. No.: 13/693,223

(22) Filed: Dec. 4, 2012

(65) Prior Publication Data
US 2013/0147360 A1   Jun. 13, 2013

(30) Foreign Application Priority Data

Dec. 7, 2011 (KR) .................. 10-2011-0130466

(51) Int. Cl.
H05B 37/02 (2006.01)
H05B 33/08 (2006.01)

(52) U.S. Cl.
CPC ......... *H05B 37/02* (2013.01); *H05B 33/0815* (2013.01); *H05B 33/0848* (2013.01); *Y02B 20/346* (2013.01)

(58) Field of Classification Search
CPC ............ H05B 33/0815; H05B 33/0827; H05B 33/0818; H05B 37/02; H05B 33/083;
(Continued)

(56) References Cited

U.S. PATENT DOCUMENTS 5,440,473 A * 8/1995 Ishii .................. H02M 1/4225
363/21.05

7,276,863 B2 * 10/2007 Lee .................. G09G 3/342
315/307
(Continued)

FOREIGN PATENT DOCUMENTS

CN   102045922 A   5/2011
CN   102111071 A   6/2011
(Continued)

OTHER PUBLICATIONS

Chinese Office Action issued on Oct. 12, 2015 in counterpart Chinese Patent Application No. 201210526209.2 (8 pages in Chinese).

(Continued)

*Primary Examiner* — Alexander H Taningco
*Assistant Examiner* — Nelson Correa
(74) *Attorney, Agent, or Firm* — NSIP Law (57) ABSTRACT

A light-emitting diode (LED) driver apparatus is provided. The LED driver apparatus includes a pulse width modulation (PWM) signal generating unit, a DC-DC converter, and a comparison voltage generating unit. The PWM signal generating unit generates a PWM signal according to a comparison voltage. The DC-DC converter supplies a driving voltage of an LED array by using the PWM signal. The comparison voltage generating unit measures a feedback voltage of the LED array and supplies a difference between the measured feedback voltage and a target voltage as a comparison voltage to the PWM signal generating unit. The comparison voltage generating unit supplies a second reference voltage as a comparison voltage to the PWM signal generating unit from a time when the driving voltage is higher than or equal to a first reference voltage to a time when the driving voltage reaches the target voltage.

22 Claims, 6 Drawing Sheets

(58) Field of Classification Search
CPC .............. H05B 33/0836; H05B 33/086; H05B 33/0884; H05B 33/0809; H05B 33/0851; H05B 33/0848
USPC ...................... 315/209 R, 224, 291, 299, 308
See application file for complete search history.

(56) References Cited

U.S. PATENT DOCUMENTS

| | | | | |
|---|---|---|---|---|
| 7,888,920 B2* | 2/2011 | Chen | .................... | G09G 3/3406 323/271 |
| 8,076,863 B2* | 12/2011 | Chao | .................... | G09G 3/3426 315/169.3 |
| 8,415,896 B2* | 4/2013 | Tseng | ................. | H05B 33/0815 315/291 |
| 8,531,446 B2* | 9/2013 | Woo | ...................... | H02M 3/156 323/282 |
| 8,569,975 B2* | 10/2013 | Uchimoto | ............ | G09G 3/3406 315/210 |
| 8,624,524 B2* | 1/2014 | Liu | ...................... | G09G 3/3406 315/291 |
| 9,035,561 B2* | 5/2015 | Tsai | ................... | H05B 33/0815 315/192 |
| 9,265,104 B2* | 2/2016 | Szczeszynski | ........... | H03K 7/08 |
| 2010/0194308 A1* | 8/2010 | Zhao et al. | ................... | 315/297 |
| 2011/0062872 A1* | 3/2011 | Jin et al. | ........................ | 315/122 |
| 2011/0068700 A1* | 3/2011 | Fan | .......................... | 315/185 R |
| 2011/0089859 A1* | 4/2011 | Tseng | ................. | H05B 33/0815 315/294 |
| 2011/0157141 A1 | 6/2011 | Woo et al. | | |
| 2011/0273104 A1 | 11/2011 | Uchimoto et al. | | |
| 2011/0285311 A1* | 11/2011 | Yang et al. | ..................... | 315/291 |
| 2012/0049755 A1* | 3/2012 | Shimizu et al. | ............... | 315/246 |
| 2012/0212141 A1* | 8/2012 | Ryu | ................... | H05B 33/0827 315/186 |
| 2013/0009556 A1* | 1/2013 | Szczeszynski | ........... | H03K 7/08 315/185 R |
| 2013/0147361 A1* | 6/2013 | Kang | ................... | H05B 33/089 315/122 |

FOREIGN PATENT DOCUMENTS

| | | |
|---|---|---|
| CN | 102238779 A | 11/2011 |
| KR | 10-0994204 | 11/2010 |
| TW | 200629967 A | 8/2006 |
| TW | 201116158 A1 | 5/2011 |

OTHER PUBLICATIONS

Taiwanese Office Action issued on Apr. 22, 2016 in counterpart Taiwanese Patent Application No. 101144848 (7 pages in Chinese).
Taiwanese Office Action issued on Aug. 12, 2016 in counterpart Taiwanese Application No. 101144848 (17 pages in Taiwanese).
Chinese Office Action issued Dec. 26, 2016, in counterpart Chinese Patent Application No. 201210526209.2 (9 pages in Chinese).

* cited by examiner

LED DRIVER APPARATUS

CROSS-REFERENCE TO RELATED APPLICATION(S)

This application claims priority under 35 U.S.C. §119 from Korean Patent Application No. 10-2011-0130466, filed on Dec. 7, 2011, in the Korean Intellectual Property Office, the disclosure of which is incorporated herein by reference in its entirety.

BACKGROUND

1. Field

The following description relates to a light-emitting diode (LED) driver apparatus, and more particularly, to an LED driver apparatus that supplies a stable output voltage and a stable output current at an initial driving.

2. Description of the Related Art

A liquid crystal display (LCD) is thinner and light in weight than other types of display apparatuses and has lower driving voltage and power consumption than the other types of display apparatuses. Therefore, the LCD is widely used. However, the LCD is a non-emitting device that cannot self-emit light and requires an additional backlight to supply light to an LCD panel.

A cold cathode fluorescent lamp (CCFL), a light-emitting diode (LED), or the like is mainly used as a backlight source of the LCD. The CCFL uses mercury and, thus, may cause an environmental pollution. Also, the CCFL has a slow response speed and a low color representation, and is inappropriate for making the LCD panel light, thin, short, and small.

The LED does not use an environmentally harmful material and, thus, is eco-friendly and enables impulse driving. Also, the LED has a high color representation, arbitrarily adjusts light amounts of red (R), green (G), and blue (B) diodes to change a luminance, a color temperature, etc., and is appropriate for making the LCD panel light, thin, short, and small. Therefore, the LED has been widely used as a backlight source of the LCD panel or the like.

LED arrays include a plurality of LEDs and are operatively connected to one another. When LED arrays are used in the LCD backlight unit, a driving circuit is needed to provide a constant current to each of the LED arrays, and a dimming circuit is also needed to adjust brightness and color temperature arbitrarily or compensating for overheating.

An LED driver apparatus compares a target voltage to drive all of the LED arrays with a driving voltage (for example, a feedback voltage) that is applied to the LEDs to control a feedback on the driving voltage. A feedback operation of a conventional LED array will now be described with reference to FIG. 6.

Figure 6:
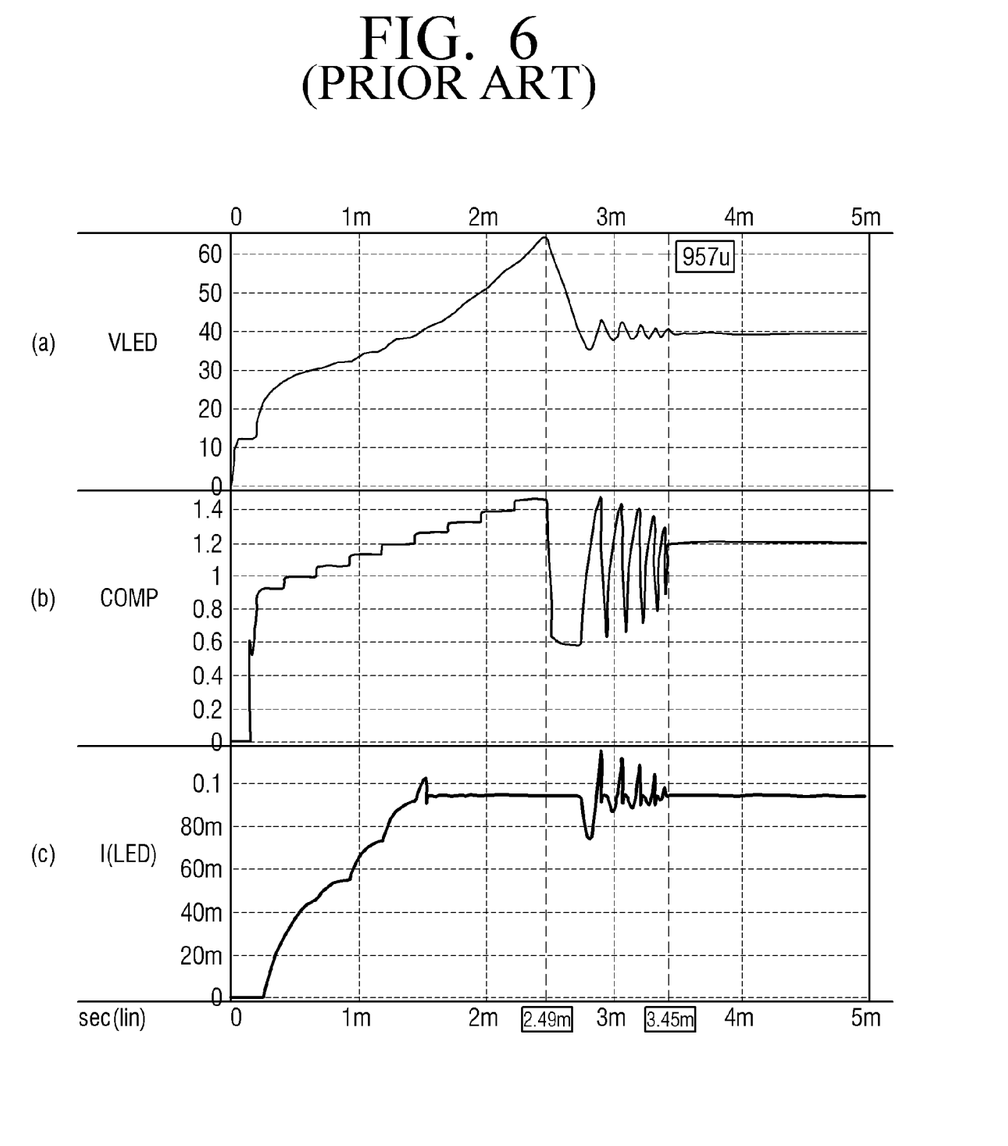
FIG. 6 is a graph illustrating waveforms of a driving voltage and a driving current of a conventional LED driver apparatus.

FIG. 6 is a graph illustrating waveforms of an initial driving voltage of a conventional LED driver apparatus, a comparison voltage, and a driving current.

Referring to (a) and (b) of FIG. 6, in order to turn on all of LED arrays at an initial stage to drive LEDs, a driving voltage higher than a target voltage is applied to the LED arrays. If the high driving voltage is applied to the LED arrays, all of the LED arrays are turned on, and, thus, a constant current flows through the LED arrays.

After the high driving voltage is applied to the LED arrays, a feedback control is immediately performed to compare the target voltage with a feedback voltage to output a comparison voltage. However, if the feedback control is immediately performed when the high driving voltage is applied to the LED arrays, the comparison voltage is lowered to a minimum voltage to weaken voltage boosting due to the higher driving voltage than the target voltage. Therefore, the voltage driving the LEDs is rapidly lowered, as a result, the driving voltage becomes lower than the target voltage. Subsequently, the comparison voltage increases in order to strengthen voltage boosting. Also, weakening and strengthening of boosting are repeatedly performed to converge the driving voltage into the target voltage due to a feedback time delay.

However, if weakening and strengthening of boosting are repeatedly as described above, a distortion of the constant current occurs as shown in (c) of FIG. 6.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The exemplary embodiments provide a light-emitting diode (LED) driver apparatus, which supplies a stable output voltage and a stable output current at an initial driving.

In accordance with an illustrative example, there is provided a light-emitting diode (LED) driver apparatus including a comparison voltage generating unit configured to measure a feedback voltage of an LED array, supply a difference between the measured feedback voltage and a target voltage as a comparison voltage to a pulse width modulation (PWM) signal generating unit, and supply a second reference voltage to the PWM signal generating unit from a time when a driving voltage for the LED array is higher than or equal to a first reference voltage to a time when the driving voltage reaches the target voltage.

The PWM signal generating unit is configured to generate the PWM signal according to the comparison voltage, and the LED driver apparatus further includes a DC-DC converter configured to supply the driving voltage for the LED array using the PWM signal.

The comparison voltage generating unit controls the PWM signal generating unit to stop a boosting operation of the DC-DC converter from the time when the driving voltage is higher than or equal to the first reference voltage to the time when the driving voltage reaches the target voltage.

The comparison voltage generating unit may also include a target voltage generating unit configured to generate the target voltage and a second target voltage, wherein the second reference voltage is added to the target voltage to generate the second target voltage, a comparator configured to compare the target voltage with the second target voltage or the measured feedback voltage, a multiplexer (MUX) configured to supply one of the second target voltage and the measured feedback voltage to the comparator, and a time controller configured to control the MUX to supply the measured feedback voltage to the comparator and to supply the second target voltage to the comparator from the time when the driving voltage is higher than or equal to the first reference voltage to the time when the driving voltage reaches the target voltage.

The time controller includes an amplifier configured to output a difference between the second target voltage and the measured feedback voltage, and an RS latch configured to receive a signal as a set signal indicative that the driving voltage is equal to the first reference voltage, and configured to receive an output of the amplifier as a reset signal.

The time controller supplies the PWM signal generating unit with a signal to stop the boosting operation of a DC-DC converter from the time when the driving voltage is higher than or equal to the first reference voltage to the time when the driving voltage reaches the target voltage.

The first reference voltage is a maximum output voltage of the DC-DC converter.

The second reference voltage has a voltage level between 100 mV and 150 mV.

The LED array includes a plurality of LED arrays, and the comparison voltage generating unit supplies a difference between lowest one of feedback voltages of the plurality of LED arrays and the target voltage as a comparison voltage to the PWM signal generating unit.

The comparison voltage generating unit includes a target voltage generating unit configured to generate the target voltage and a second target voltage, wherein the second reference voltage is added to the target voltage to generate the second target voltage, a voltage measurer configured to measure the feedback voltages of the plurality of LED arrays and output the lowest one of the measured feedback voltages, a comparator configured to compare the target voltage with the second target voltage or the feedback voltages output from the voltage measurer, a MUX configured to supply one of the second target voltage and the feedback voltages output from the voltage measurer to the comparator, and a time controller configured to control the MUX to supply the feedback voltages output from the voltage measurer to the comparator and to supply the second target voltage to the comparator from the time when the driving voltage is higher than or equal to the first reference voltage to the time when the driving voltage reaches the target voltage.

In accordance with another illustrative example, there is provided a comparison voltage generating unit of an LED driver apparatus, including a target voltage generating unit configured to generate a target voltage and a second target voltage, a multiplexer (MUX) configured to receive the second target voltage and receive a feedback voltage from an LED array, and a time controller configured to supply a pulse width modulation (PWM) signal generating unit with a control signal to stop a voltage boosting of a DC-DC converter from a time when a driving voltage of the LED array is higher than or equal to a first reference voltage to the time when the driving voltage reaches the target voltage. The MUX is further configured to receive the control signal and selectively output the second target voltage or the feedback voltage according to the control signal.

A comparator is configured to compare the target voltage from the target voltage generating unit with the second target voltage from the target voltage generating unit or the feedback voltage output from the voltage measurer.

The comparator outputs a difference between the generated target voltage and the second target voltage or the feedback voltage as a comparison voltage, and supplies the comparison voltage to the PWM signal generating unit.

The target voltage has a voltage value corresponding to a forward bias voltage of the LED array to operate the LED array in a saturation area, and the second target voltage has a voltage value that is greater than the target voltage by a second reference voltage between 100 mV and 150 mV.

The feedback voltage is a voltage of a node to which the LED array and an LED driving unit are connected.

The first reference voltage is a preset voltage that is higher than the driving voltage supplied from the DC-DC converter to the LED array in a normal operation of the LED array.

The time controller includes an amplifier configured to output a difference between the second target voltage and the measured feedback voltage, and an RS latch configured to receive a signal to acknowledge that the driving voltage is equal to the first reference voltage, as a set signal, receive an output of the amplifier as a reset signal, and output selection signals corresponding to inputs as set and reset signals.

The LED array includes a plurality of LED arrays and the comparison voltage generating unit further includes a voltage measurer configured to measure feedback voltages of the plurality of LED arrays and output a lowest one of the measured feedback voltages of the plurality of LEDs.

In accordance with a further illustrative example, there is provided a light-emitting diode (LED) driver apparatus including an LED array, an input unit configured to receive a dimming signal to drive the LED array, a pulse width modulation (PWM) signal generating unit configured to generate a PWM signal according to a comparison voltage, a DC-DC converter configured to supply a driving voltage to the LED array based on the PWM signal, a comparison voltage generating unit configured to measure a feedback voltage of the LED array, supply a difference between the measured feedback voltage and a target voltage as the comparison voltage, and supply a second reference voltage to the PWM signal generating unit from a time when a driving voltage for an LED array is higher than or equal to a first reference voltage to a time when the driving voltage reaches the target voltage, and an LED driving unit configured to adjust an amplitude of a driving current of the LED array by using the dimming signal and to supply the adjusted constant current to the LED array.

The comparison voltage generating unit controls the PWM signal generating unit to stop a boosting operation of the DC-DC converter from the time when the driving voltage is higher than or equal to the first reference voltage to the time when the driving voltage reaches the target voltage.

As described above, an LED driver apparatus according to an illustrative example, may supply a stable output voltage and a stable output current to an LED array at an initial driving.

BRIEF DESCRIPTION OF THE DRAWINGS

The above and/or other aspects will be more apparent by describing certain exemplary configurations with reference to the accompanying drawings, in which.

DETAILED DESCRIPTION

Exemplary configurations are described in greater detail with reference to the accompanying drawings.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. Throughout the drawings and the detailed description, unless otherwise described, the same drawing reference numerals will be understood to refer to the same elements, features, and structures. The relative size and depiction of these elements may be exaggerated for clarity, illustration, and convenience.

It will be understood that when an element is referred to as being "on," "connected to," or "operatively connected to" another element or unit, it can be directly on or connected to another element or unit through intervening elements or units. In contrast, when an element is referred to as being "directly on" or "directly connected to" another element or layer, there are no intervening elements or layers present. Like reference numerals refer to like elements throughout. As used herein, the term "and/or" includes any and all combinations of one or more of the associated listed items.

The units described herein may be implemented using hardware components. The hardware components may include, for example, controllers, processors, generators, drivers, resistors, filters, metal-oxide-semiconductor field-effect transistor (MOSFETs), metal-insulator-semiconductor FET (MISFETs), metal-oxide-semiconductors (MOSs), and other equivalent electronic components.

Figure 1:
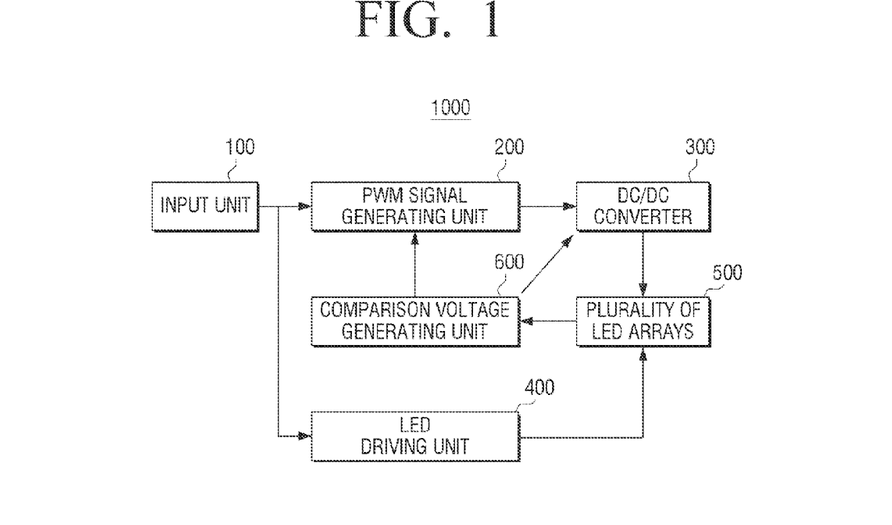
FIG. 1 is a block diagram of a light-emitting diode (LED) driver apparatus, according to an exemplary configuration.

FIG. 1 is a block diagram of a light-emitting diode (LED) driver apparatus 1000, according to an exemplary configuration.

Referring to FIG. 1, the LED driver apparatus 1000 includes an input unit 100, a pulse width modulation (PWM) signal generating unit 200, a DC-DC converter 300, an LED driving unit 400, a plurality of LED arrays 500, and a comparison voltage generating unit 600.

The input unit 100 receives a dimming signal to drive the LED arrays 500. Examples of a digital dimming method generating the dimming signal for an LED array include a direct mode, a fixed phase mode, and a phase shift mode. In one example, the direct mode refers to a method of controlling a PWM frequency and an on duty through a packet assembler/disassembler (PAD). Also, the fixed phase mode and the phase shift mode may refer to methods of generating a PWM frequency in an integrated circuit (IC) and receiving only an on duty through the PAD to control the PWM frequency and the on duty. The dimming signal may refer to a signal to adjust a luminance, a color temperature, etc. of an LED or to compensate for a high temperature of the LED. In the present exemplary configuration, the direct mode, which receives the diming signal from an external device, is used. However, a mode such as the fixed phase mode and/or the phase shift mode may also be used.

The PWM signal generating unit 200 generates a PWM signal according to a comparison voltage. Specifically, the PWM signal generating unit 200 may generate a PWM signal, to control a level of a driving voltage of the DC-DC converter 300, and according to the comparison voltage generated by the comparison voltage generating unit 600. If a control signal is transmitted from the comparison voltage generating unit 600 to the DC-DC converter 300 to stop a voltage boosting operation, to be described later, the PWM signal generating unit 200 stops generating the PWM signal to stop the voltage boosting operation at the DC-DC converter 300.

The DC-DC converter 300 includes a transistor to perform a switching operation and supply a driving voltage to the LED arrays 500 through the switching operation of the transistor. For example, the DC-DC converter 300 converts a direct current (DC) voltage based on the PWM signal generated by the PWM signal generating unit 200 and supplies the converted DC voltage (i.e., the driving voltage) to the LED arrays 500. Here, the DC-DC converter 300 may supply the LED array 500 with a voltage or a target voltage corresponding to a forward bias voltage of the LED arrays 500 in order to operate the LED arrays 500 in a saturation area.

Based on the dimming signal, the LED driving unit 400 supplies a constant current to drive the LED arrays 500. In detail, the LED driving unit 400 adjusts an amplitude of a driving current of the LED arrays 500 by using the dimming signal and supplies the adjusted constant current or the driving current to the LED arrays 500. Detailed structure and operation of the LED driving unit 400 will be described later with reference to FIG. 3.

The LED arrays 500 include a plurality of LEDs which are connected to one another in series and perform light-emitting operations. Although FIG. 1 and the description provided refer to a plurality of LED arrays 500 or LED arrays 500, one LED array may be used to embody, to control, and to perform the functions and configuration described herein with respect to the plurality of LED arrays 500 or LED arrays 500.

The comparison voltage generating unit 600 measures a feedback voltage from the LED array 500. The feedback voltage is a voltage of a node to which the LED arrays 500 and the LED driving unit 400 are connected. The comparison voltage generating unit 600 supplies a difference between the measured feedback voltage and a target voltage as a comparison voltage to the PWM signal generating unit 200. The comparison voltage generating unit 600 also supplies to the PWM signal generating unit 200 a second reference voltage as a comparison voltage for a transition time after an initial driving of the LED array 500. The transition time is measured from a time when the driving voltage is higher than or equal to a first reference voltage to a time when the driving voltage reaches the target voltage. Here, the first reference voltage refers to a preset voltage that is higher than the driving voltage supplied from the DC-DC converter 300 to the LED arrays 500 in a normal operation of the LED arrays 500. For example, the first reference voltage is a maximum output voltage of the DC-DC converter 300. The second reference voltage, for example, is a voltage having a level between 100 mV and 150 mV. Levels of the first and second reference voltages may be changed in each system, and optimized voltage values may be selected as the first and second reference voltages through a test of a manufacturer.

The comparison voltage generating unit 600 supplies the PWM signal generating unit 200 with a control signal to stop a voltage boosting operation of the DC-DC converter 300 during the transition time; that is, from the time when the driving voltage is higher than or equal to the first reference voltage to the time when the driving voltage reaches the target voltage.

As described above, the comparison voltage generating unit 600 generates a comparison voltage using a feedback voltage of one LED array. However, when the LED driver apparatus 1000 drives a plurality of LED arrays, the comparison voltage generating unit 600 may generate a comparison voltage by using lowest one of feedback voltages of the plurality of LED arrays. This will be described later with reference to FIG. 3.

As described above, the LED driver apparatus 1000, according to the present exemplary configuration, uses a second reference voltage at a transition time after an initial driving of an LED, and a comparison voltage as a difference between a feedback voltage and a target voltage. Therefore, a voltage applied to the LED array 500 immediately converges into the target voltage, thereby stabilizing a current flowing through the LED array 500.

Figure 2:
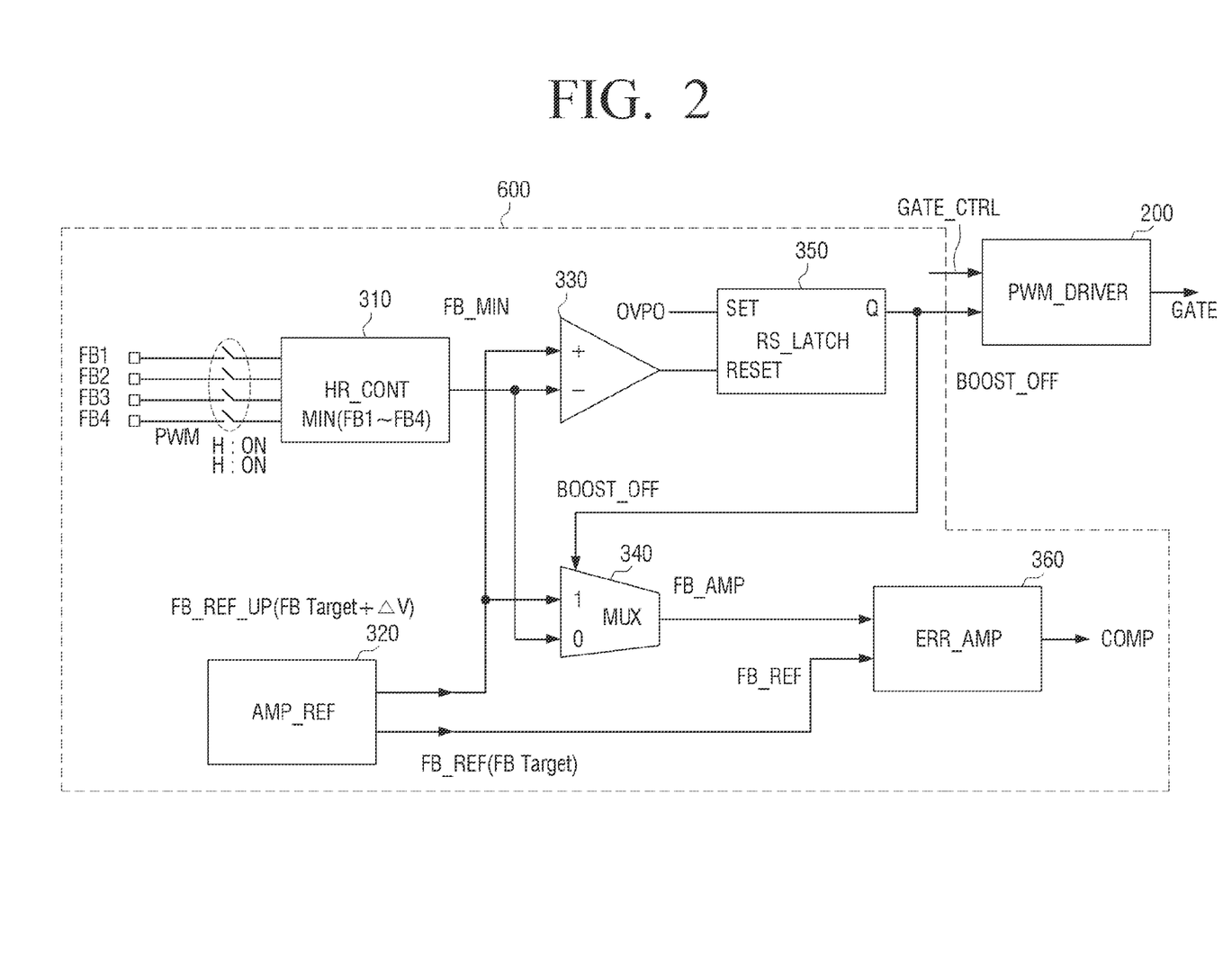
FIG. 2 is a block diagram illustrating a detailed structure of a comparison voltage generating unit of FIG. 1.

FIG. 2 is a block diagram illustrating a detailed structure of a comparison voltage generating unit 600 as illustrated in FIG. 1.

Referring to FIG. 2, the comparison voltage generating unit 600 includes a voltage measurer 310, a target voltage generating unit 320, a multiplexer (MUX) 340, time controllers 330 and 350, and a comparator 360.

Figure 3:
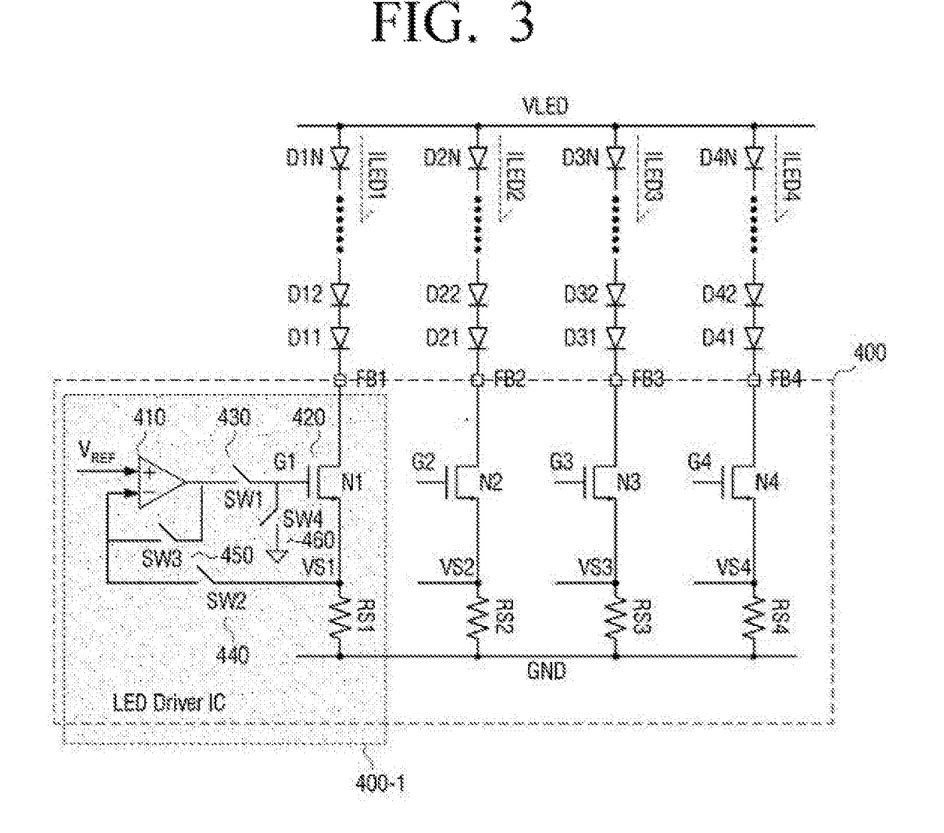
FIG. 3 is a block diagram illustrating a detailed structure of an LED driving unit of FIG. 1.

The voltage measurer 310 measures feedback voltages, for example FB1-FB4 as shown in FIG. 2 and FIG. 3, of a plurality of LED arrays and outputs a lowest one FB MIN of the measured feedback voltages. For example, the voltage measurer 310 measures feedback voltages of four LED arrays in FIG. 3, but may measure feedback voltages of three or five or more LED arrays. If the LED driver apparatus 1000 drives only one LED array, the voltage measurer 310 may be omitted.

The target voltage generating unit 320 generates a target voltage FB REF (FB Target) and a second target voltage FB REF UP (FB Target +ΔV). In one example, the target voltage has a voltage value corresponding to a forward bias voltage of the LED arrays 500 in order to operate the LED arrays 500 in a saturation area. The second target voltage has a voltage value that is greater than the target voltage by a second reference voltage between 100 mV and 150 mV.

The MUX 340 supplies the comparator 360 with the second target voltage and one of the feedback voltages output from the voltage measurer 310. In detail, the MUX 340 receives the second target voltage from the target voltage generating unit 320, receives the feedback voltage from the voltage measurer 310, receives a control signal Boost_off from the time controllers 330 and 350, and selectively outputs a signal FB AMP, which is either the second target voltage or the feedback voltage, according to the control signal Boost_off.

The time controllers 330 and 350 control the MUX 340 to supply the comparator 360 with the feedback voltage output from the voltage measurer 310 and to supply the comparator 360 with the second target voltage from a time when a driving voltage is higher than or equal to a first reference voltage VOVP to a time when the measured feedback voltage is less than or equal to the second target voltage. The signal OVPO in FIG. 2 indicates that the driving voltage is higher than or equal to a first reference voltage. Also, the time controllers 330 and 350 supply the PWM signal generating unit 200 with a control signal, which is a signal configured to stop a voltage boosting operation of the DC-DC converter 300 from the time when the driving voltage is higher than or equal to the first reference voltage to the time when the measured feedback voltage is less than or equal to the second target voltage. The time controllers 330 and 350 may include an amplifier 330 and an RS latch 350.

The amplifier 330 outputs a difference between the second target voltage and the measured feedback voltage. In detail, the amplifier 330 may be configured as an operational amplifier (OP-AMP). The amplifier 330 receives the measured feedback voltage from the voltage measurer 310 through a negative terminal of the OP-AMP, and receives the second target voltage generated by the target voltage generating unit 320 through a positive terminal of the OP-AMP. The amplifier 330 outputs the difference between the second target voltage and the measured feedback voltage to the comparator 360 which will be described later.

The RS latch 350 receives a signal, which is to acknowledge that the driving voltage is equal to the first reference voltage, as a set signal and receives an output of the amplifier 330 as a reset signal. The RS latch 350 outputs selection signals corresponding to inputs as the set and reset signals, as shown below in a truth table. The RS latch 350 is used in the present exemplary configuration but may be configured as another flip-flop having the same function.

TABLE 1

| SET | RESET | Q |
|---|---|---|
| 0 | 0 | Maintain |
| 0 | 1 | 0 |
| 1 | 0 | 1 |
| 1 | 1 | Forbid Setting |

The comparator 360 compares the target voltage from the target voltage generating unit 320 with the second target voltage from the target voltage generating unit 320 or the feedback voltage output from the voltage measurer 310. As a result of the comparison, the comparator 360 outputs a difference between the generated target voltage and the second target voltage or the feedback voltage as a comparison voltage. For example, the comparator 360 receives the target voltage generated by the target voltage generating unit 320 and an output voltage of the MUX 340, generates the comparison voltage by determining difference between the target voltage and the output voltage, and supplies the comparison voltage to the PWM signal generating unit 200.

FIG. 3 is a block diagram illustrating a detailed structure of the LED driving unit 400 of FIG. 1.

Referring to FIG. 3, the LED driving unit 400 includes a comparator 410, a transistor 420, a resistor RS1, and a plurality of switching units 430, 440, 450, and 460.

The comparator 410 compares a voltage Vs of a common node, which the transistor 420 and the resistor RS1 commonly contact, with a preset comparison voltage $V_{REF}$ to control the transistor 420. In one example, the comparator 410 may be realized as an OP-AMP. When the comparator 410 is realized as the OP-AMP, the comparator 410 includes a positive terminal that receives the comparison voltage $V_{REF}$, a negative terminal that receives the voltage Vs of the common node, and an output terminal that is connected to a gate of the transistor 420 through the first switch 430.

The transistor 420 performs a switching operation according to an output signal of the comparator 410 and connection states of the plurality of switching units 430, 440, 450, and 460. For example, the transistor 420 includes a drain which is connected to an end of the LED array 500, a source which is connected to the resistor RS1, and a gate which is connected to the output terminal of the comparator 410 through the first switch 430. In one instance, the transistor is configured using an n-MOS transistor, but may be realized by using another type of switching element.

The resistor RS1 includes an end that is connected to the source of the transistor 420 and another end that is grounded.

The plurality of switches 430, 440, 450, and 460 selectively supply the output signal of the comparator 410 to the transistor 420 according to a dimming signal.

In one configuration, the first switch 430 is disposed between the comparator 410 and the gate of the transistor 420. The first switch 430 is connected when the dimming signal is turned on, and is open when the dimming signal is turned off.

The second switch 440 is disposed between the common node, which the source of the transistor 420 and the resistor RS1 commonly contact, and the negative terminal of the comparator 410. The second switch 440 is connected when the dimming signal is turned on, and is open when the dimming signal is turned off.

The third switch 450 is disposed between the negative terminal of the comparator 410 and the output terminal of the comparator 410. The third switch 450 is open when the dimming signal is turned on, and is connected when the dimming signal is turned off.

The fourth switch 460 is disposed between the gate and a ground node of the transistor 420. The fourth switch 460 is open when the dimming signal is turned on, and is connected when the dimming signal is turned off.

Therefore, when the dimming signal is turned on, the first and second switches 430 and 440 are connected, and the third and fourth switches 450 and 460 are open. As a result, the comparator 410 compares the voltage Vs of the common node that the transistor 420 and the resistor RS1 with the preset comparison voltage $V_{REF}$ to control the transistor 420.

When the dimming signal is turned off, the first and second switches 430 and 440 are open, and the third and fourth switches 450 and 460 are connected. Therefore, the gate of the transistor 420 is connected to the ground node, and the transistor 420 cuts a supply of a constant current to the LED array 500.

Figure 4:
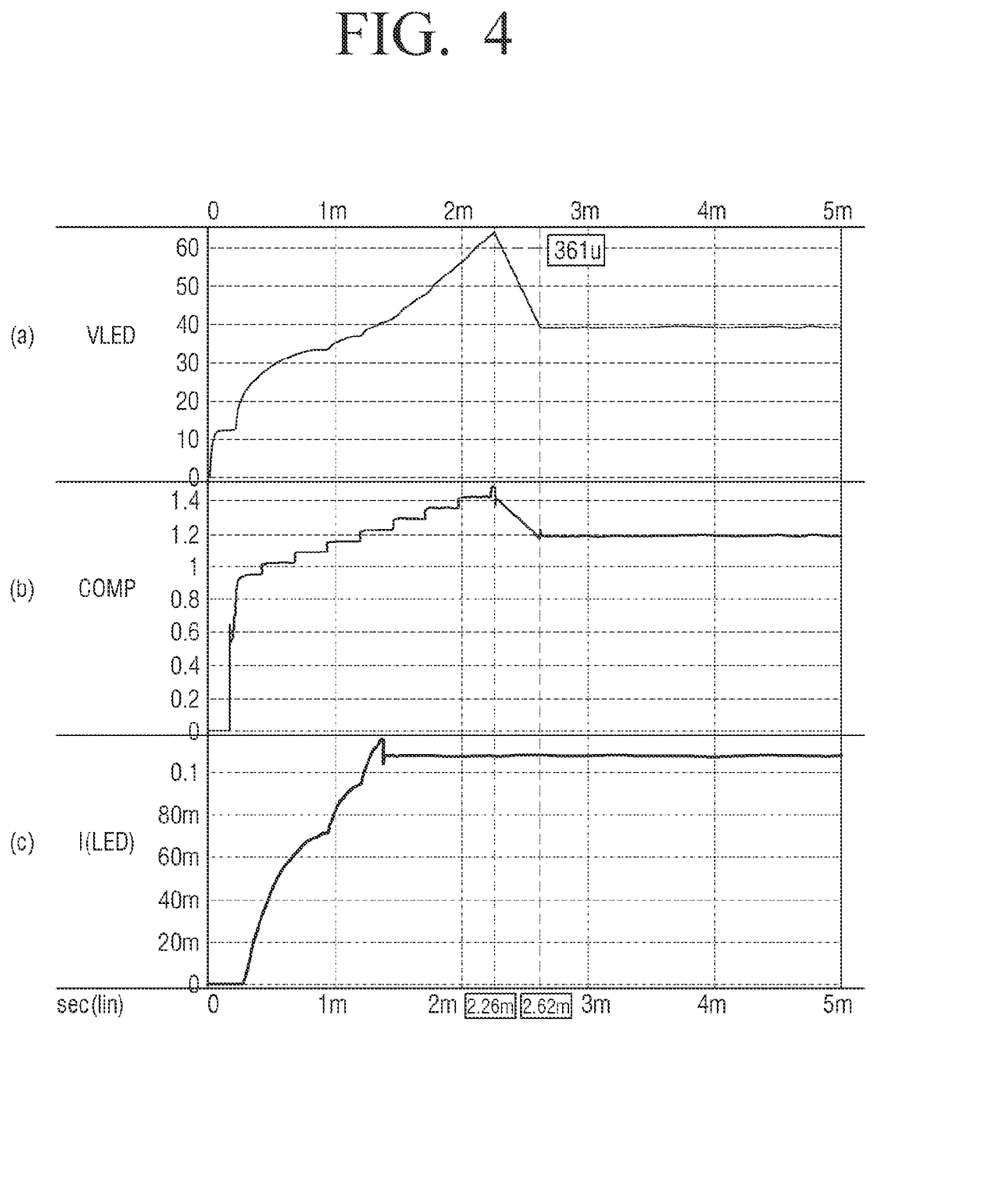
FIGS. 4 and 5 are graphs illustrating waveforms of a driving voltage and a driving current of an LED driver apparatus, according to an illustrative configuration.
Figure 5:
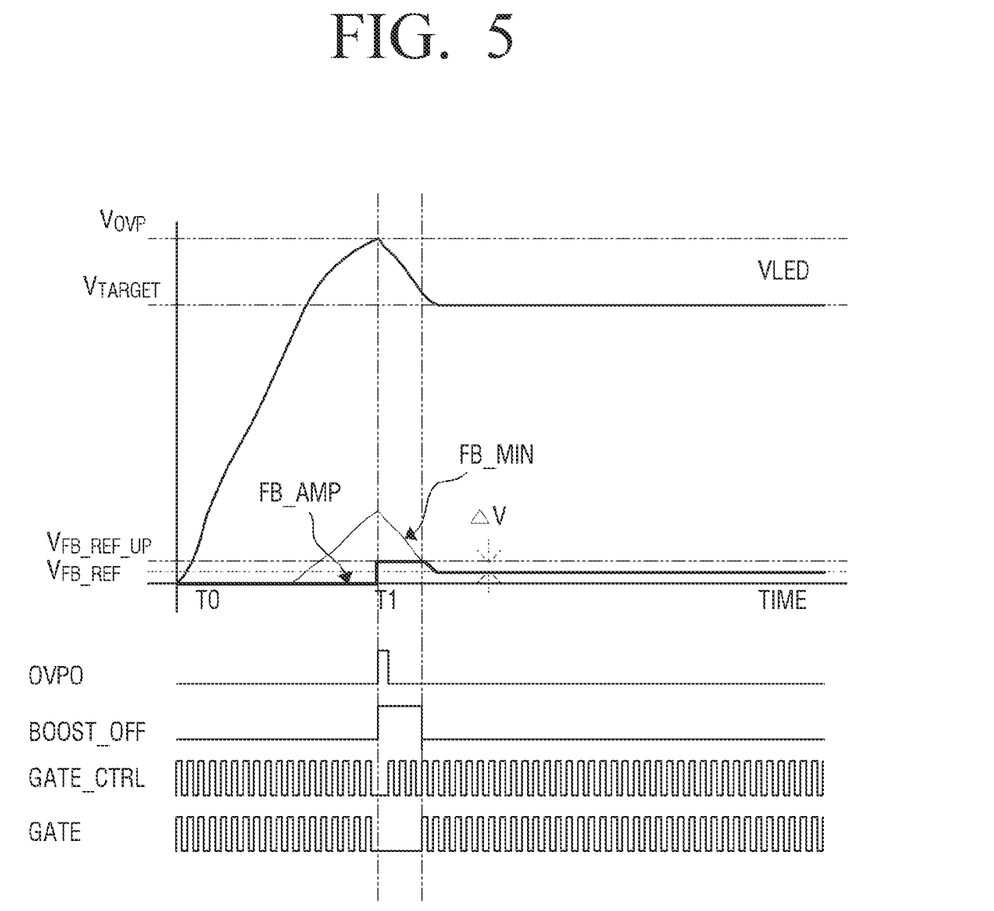

FIGS. 4 and 5 are graphs illustrating waveforms of a driving voltage and a driving current of the LED driver apparatus 1000, according to an illustrative configuration.

Comparing the waveforms shown in FIGS. 4 and 5 with the waveforms shown in FIG. 6, according to an illustrative configuration, a driving voltage in the LED driver apparatus 1000 applied to the LED array 500 is stably changed into a target voltage after a time when the driving voltage is higher than or equal to a first reference voltage. Therefore, a constant current supplied to the LED array 500 is also stably maintained.

It will be understood that, although the terms first, second, third, etc. may be used herein to describe various elements, components, units and/or sections, these elements, components, units and/or sections should not be limited by these terms. These terms are only used to distinguish one element, component, unit or section from another region, layer or section. These terms do not necessarily imply a specific order or arrangement of the elements, components, regions, layers and/or sections. Thus, a first element, component, unit or section discussed below could be termed a second element, component, unit or section without departing from the teachings description of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A light-emitting diode (LED) driver apparatus comprising:
    a comparison voltage generating unit configured to
        measure a feedback voltage of an LED array,
        generate a first target voltage and a second target voltage;
        selectively output, to a comparator, the measured feedback voltage or, in response to generation of a signal to stop a boosting operation of a DC-DC converter, the second target voltage, wherein the comparator is configured to compare the first target voltage with the selectively output measured feedback voltage or second target voltage to obtain a comparison voltage; and
        supply the comparison voltage to a pulse width modulation (PWM) signal generating unit,
        wherein the generation of signal to stop a boosting operation of the DC-DC converter begins in response to receiving an indication that a driving voltage for the LED array is higher than or equal to a first reference voltage, and ends in response to the measured feedback voltage being less than or equal to the second target voltage.

2. The LED driver apparatus of claim 1, wherein
    the PWM signal generating unit is configured to generate a PWM signal, according to the comparison voltage, and
    the DC-DC converter is configured to supply the driving voltage for the LED array by using the PWM signal.

3. The LED driver apparatus of claim 2, wherein the comparison voltage generating unit is configured to control the PWM signal generating unit to stop the boosting operation of the DC-DC converter in response to the generation of the signal to stop the boosting operation of the DC-DC converter.

4. The LED driver apparatus of claim 1, wherein the comparison voltage generating unit comprises:
    a target voltage generating unit configured to generate the first target voltage and the second target voltage, wherein a second reference voltage is added to the first target voltage to generate the second target voltage;
    a multiplexer (MUX) configured to selectively output, to the comparator, the measured feedback voltage or the second target voltage; and
    a time controller configured to control the MUX by generating the signal to stop the boosting operation of the DC-DC converter.

5. The LED driver apparatus of claim 4, wherein the time controller comprises:
    an amplifier configured to output a difference between the second target voltage and the measured feedback voltage; and
    an RS latch configured to
        receive a signal as a set signal indicative that the driving voltage is equal to the first reference voltage, and
        receive an output of the amplifier as a reset signal.

6. The LED driver apparatus of claim 4, wherein the time controller is configured to supply, to the PWM signal generating unit, the signal to stop the boosting operation of a DC-DC converter.

7. The LED driver apparatus of claim 1, wherein the first reference voltage is a maximum output voltage of the DC-DC converter.

8. The LED driver apparatus of claim 1, wherein a difference between the first target voltage and the second target voltage is a second reference voltage having a value between 100 mV and 150 mV, inclusive.

9. The LED driver apparatus of claim 1, wherein:
the LED array comprises a plurality of LED arrays;
each of the plurality of LED arrays outputs a feedback voltage; and
the measured feedback voltage is a lowest one of the feedback voltages of the plurality of LED arrays.

10. The LED driver apparatus of claim 9, wherein the comparison voltage generating unit comprises:
a target voltage generating unit configured to generate the first target voltage and the second target voltage, wherein a second reference voltage is added to the first target voltage to generate the second target voltage;
a voltage measurer configured to measure the feedback voltages of the plurality of LED arrays, and to output the lowest one of the measured feedback voltages;
a multiplexer (MUX) configured to supply, to the comparator, one of the second target voltage and the measured feedback voltage output from the voltage measurer; and
a time controller configured to control the MUX to supply, to the comparator,
the lowest one of the measured feedback voltages output from the voltage measurer,or
in response to the qeneration of the signal to stop the boosting operation of the DC-DC converter, the second target voltage.

11. The LED driver apparatus of claim 1,
wherein the first target voltage is compared with a multiplexed selection of the second target voltage and the measured feedback voltage.

12. A comparison voltage generating unit of an LED driver apparatus, comprising:
a target voltage generating unit configured to generate a first target voltage and a second target voltage;
a time controller configured to supply, to a pulse width modulation (PWM) signal generating unit, a control signal to stop a voltage boosting of a DC-DC converter, wherein the supplying begins in response to receiving an indication that a driving voltage of the LED array is higher than or equal to a first reference voltage, and ends in response to the measured feedback voltage being less than or equal to the second target voltage;
a multiplexer (MUX) configured to
receive the second target voltage,
receive a measured feedback voltage from an LED array,
receive the control signal, and
selectively output the second target voltage or the measured feedback voltage, according to the control signal; and
a comparator configured to compare the first target voltage, with the selectively output second target voltage or measured feedback voltage.

13. The comparison voltage generating unit of the LED driver apparatus of claim 12, wherein the comparator is configured to output, as a comparison voltage, a difference between the first target voltage and the selectively output second target voltage or measured feedback voltage, and
supply the comparison voltage to the PWM signal generating unit.

14. The comparison voltage generating unit of the LED driver apparatus of claim 12, wherein
the first target voltage has a voltage value corresponding to a forward bias voltage of the LED array, to operate the LED array in a saturation area, and
the second target voltage has a voltage value that is greater than the first target voltage, by a second reference voltage having a value between 100 mV and 150 mV, inclusive.

15. The comparison voltage generating unit of the LED driver apparatus of claim 12, wherein the feedback voltage is a voltage of a node to which the LED array and an LED driving unit are connected.

16. The comparison voltage generating unit of the LED driver apparatus of claim 12, wherein the first reference voltage is a preset voltage that is higher than the driving voltage supplied from the DC-DC converter to the LED array in a normal operation of the LED array.

17. The comparison voltage generating unit of the LED driver apparatus of claim 12, wherein the time controller comprises
an amplifier configured to output a difference between the second target voltage and the measured feedback voltage, and
an RS latch configured to
receive, as a set signal, a signal to indicate that the driving voltage is equal to the first reference voltage,
receive an output of the amplifier as a reset signal, and
output the control signal based on the set and reset signals.

18. The comparison voltage generating unit of the LED driver apparatus of claim 12, wherein
the LED array comprises a plurality of LED arrays that each output a feedback voltage, and
the comparison voltage generating unit further comprises:
a voltage measurer configured to
measure the feedback voltages of the plurality of LED arrays, and
output a lowest one of the measured feedback voltages of the plurality of LEDs.

19. The comparison voltage generating unit of the LED driver apparatus of claim 12,
wherein the first target voltage is compared with a multiplexed selection of the second target voltage and the measured feedback voltage.

20. A light-emitting diode (LED) driver apparatus comprising:
an LED array;
a pulse width modulation (PWM) signal generating unit configured to generate a PWM signal, according to a comparison voltage;
a DC-DC converter configured to supply a driving voltage, to the LED array, based on the PWM signal;
a comparison voltage generating unit configured to
measure a feedback voltage of the LED array,
generate a first target voltage and a second target voltage;
selectively output, to a comparator, the measured feedback voltage or, in response to generation of a signal configured to stop a boosting operation of the DC-DC converter, the second target voltage; and supply the result of a comparison, by the comparator, of the first target voltage and the selectively output measured feedback voltage or second target voltage as a comparison voltage, wherein the generation of the signal begins in response to receiving an indication that a driving voltage for the LED array is higher than or equal to a first reference voltage, and ends in response to the measured feedback voltage being less than or equal to the second target voltage.

21. The LED driver apparatus of claim 20, wherein the comparison voltage generating unit is configured to control the PWM signal generating unit using the generated signal.

22. The LED driver apparatus of claim 20, wherein a second reference voltage is added to the first target voltage to generate the second target voltage; and wherein the multiplexing is based on the signal configured to stop a boosting operation of the DC-DC converter.

* * * * *